Feb. 22, 1955 R. ADLER 2,702,874

DEFLECTION SYSTEM

Filed Dec. 13, 1950 2 Sheets-Sheet 1

INVENTOR.
ROBERT ADLER
BY Francis W. Crotty
HIS ATTORNEY

DEFLECTION SYSTEM

Filed Dec. 13, 1950 2 Sheets-Sheet 2

INVENTOR.
ROBERT ADLER
BY Francis W. Crotty
HIS ATTORNEY

United States Patent Office 2,702,874

Patented Feb. 22, 1955

2,702,874

DEFLECTION SYSTEM

Robert Adler, Northfield, Ill., assignor to Zenith Radio Corporation, a corporation of Illinois Application December 13, 1950, Serial No. 200,649

10 Claims. (Cl. 315—27)

This invention relates to television receivers and the like and more particularly to a novel deflection system for an image-reproducing device such as a cathode-ray tube.

In a conventional television receiver, of the type using a cathode-ray tube for image reproduction, video-signal components of a received composite television signal are employed to control the intensity of the electron beam of a cathode-ray tube, while synchronizing-signal components of the received composite television signal are used to control a pair of sweep-signal generators which impress deflection currents of generally sawtooth waveform on a pair of magnetic-deflection coils associated with the image-reproducing device. According to common practice, vertical deflection is provided at a relatively low field frequency while horizontal deflection is provided at a relatively high line frequency.

It is well known in the art that in order to obtain optimum picture fidelity the deflection currents applied to the respective magnetic-deflection coils must increase linearly throughout each trace interval. On the other hand, many conventional sweep-signal generators are characterized by a substantial amount of non-linearity in the output current waveform. This effect is particularly troublesome in the line-frequency sweep system, resulting in a tendency to compress the right side of the reproduced image. It is known that compensation of this undesirable non-linearity may be obtained by means of a saturable reactor effectively connected in series with the deflection coil or yoke and having a premagnetized core so that its inductance decreases as the sweep-current increases toward the end of each trace interval with the result that the fraction of the total voltage developed which is applied to the deflection coil is increased. Various schemes have been proposed for providing the necessary premagnetization of the saturable reactor core, all of which have required the provision of a choke or other means for separating the alternating-current and direct-current circuits.

It is further known to the art that the size of the reproduced image may be controlled by including a variable inductor either in series or in shunt with the magnetic-deflection coil. However, size control and linearity control have always been provided by means of separate control devices.

It is an important object of the invention to provide a new and improved deflection circuit for a cathode-ray tube in which a single control device is provided for concomitantly controlling linearization of the sweep current and size of the reproduced image.

It is a further object of the invention to provide a new and improved saturable reactor for use as a linearizing device in the deflection system associated with a cathode-ray tube.

Yet another object of the invention is to provide a saturable reactor in which the alternating-flux producing means and unidirectional-flux producing means are inherently separated, thereby obviating the necessity for a choke or balancing arrangement in the external circuit.

In accordance with the invention, a deflection circuit for a cathode-ray tube comprises a magnetic-deflection coil responsive to an applied scanning current to deflect the electron beam of the cathode-ray tube in accordance with a predetermined scanning pattern. A sweep-signal generator is coupled to the deflection coil for applying thereto a periodic scanning current of generally sawtooth waveform. A linearizing device is effectively connected in series with the deflection coil and comprises a coil encompassing a high-permeability ferromagnetic core, together with means for inducing in the core unidirectional magnetic flux having a non-uniform distribution within the core. Means are also provided for varying the intensity of the magnetic flux induced in the core to control the amplitude of deflection of the electron beam.

As employed throughout the specification and the appended claims, the term "unidirectional flux" is descriptive of a time condition rather than a space condition. In other words, a unidirectional magnetic flux is one which is invariant with time for any particular operating condition; the space distribution of a unidirectional magnetic flux may be multi-directional.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 2:
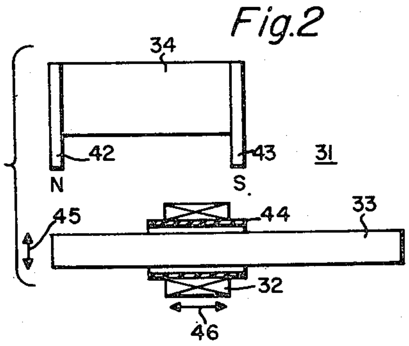
Figure 2 is an elevational view, partly in cross-section and partly schematic, of a linearizing device constructed in accordance with the invention.
Figure 5:
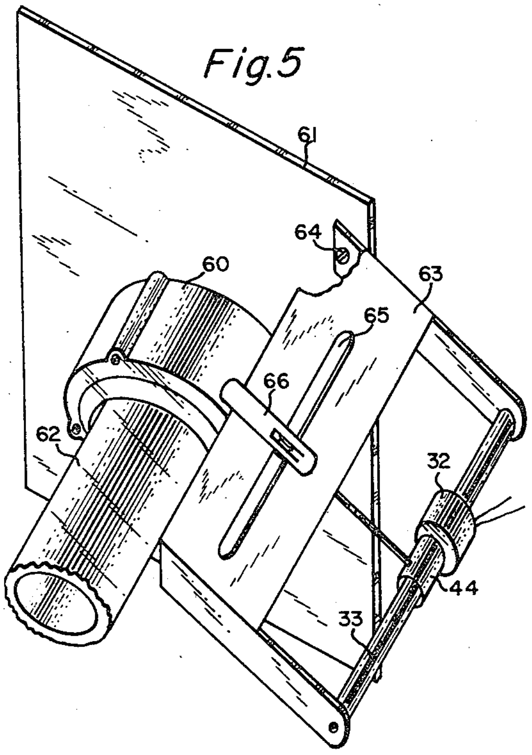
Figure 3A:
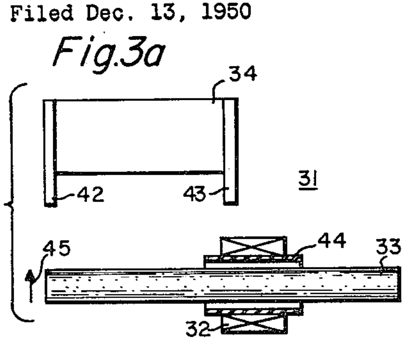
Figure 4A:
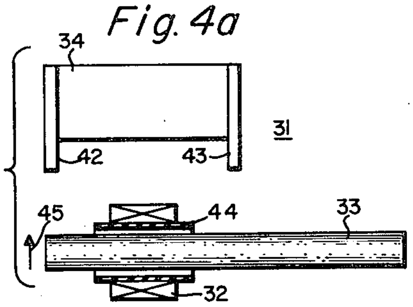
Figure 3B:
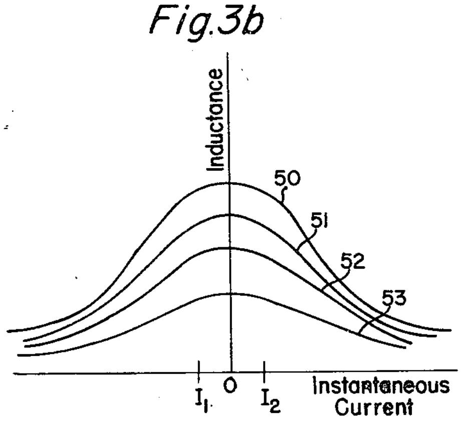
Figure 4B:
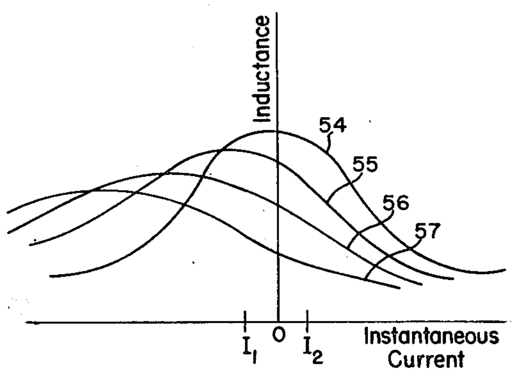
Figure 6:
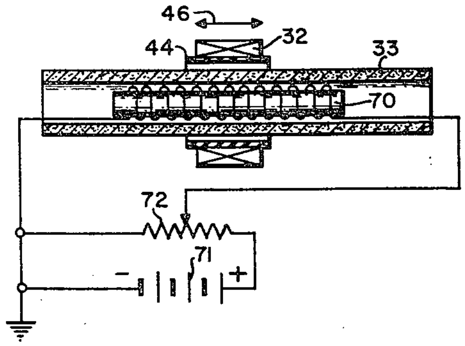

Figures 3*a* and 4*a* are views similar to that of Figure 2 illustrating two different operating conditions of the linearizing device;

Figures 3*b* and 4*b* are graphical representations of operating characteristics obtained under the operating conditions represented by Figures 3*a* and 4*a* respectively;

Figure 5 is a fragmentary perspective view of a physical embodiment of the invention, and Figure 6 is an elevational view, partly in cross-section and partly schematic, of another embodiment of the invention.

Figure 1:
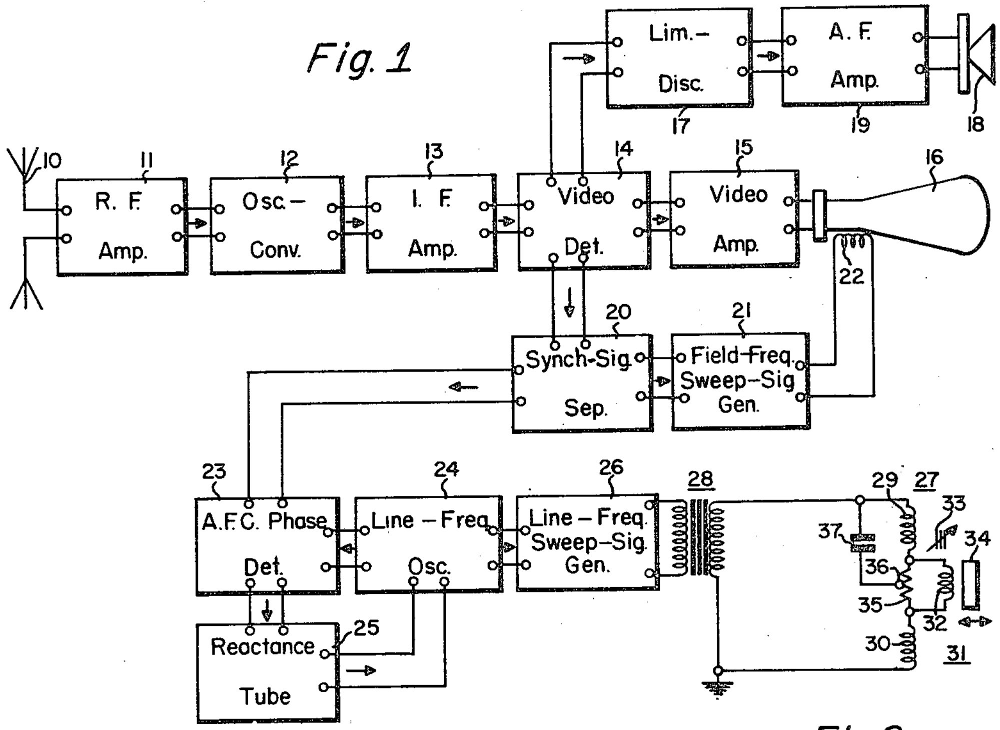
Figure 1 is a schematic circuit diagram of a television receiver embodying a linearizing device constructed in accordance with the present invention.

As shown in Figure 1, a television receiver embodying the invention may comprise an antenna 10 for receiving a composite television signal. The signal received by antenna 10 is amplified by a radio-frequency amplifier 11 consisting of one or more stages, and the amplified signal is applied to an oscillator-converter 12. The output signal from oscillator-converter 12 is applied to an intermediate-frequency amplifier 13 consisting of one or more stages and coupled to a video detector 14. Video-frequency components of the intermediate-frequency signal, appearing in the output of video detector 14, are amplified by a video amplifier 15, and the amplified video-frequency signal is employed to control the intensity of the electron beam of a cathode-ray tube 16.

Intercarrier sound signals developed by video detector 14 are applied to a limiter-discriminator 17 and the detected output from limiter-discriminator 17 is applied to a loudspeaker 18 or other sound-reproducing device after amplification by means of an audio-frequency amplifier 19.

The detected composite video signal from video detector 14 is also applied to a synchronizing-signal separator 20 which serves to separate the line-frequency and field-frequency synchronizing-signal components from the video-frequency components and from each other. Field-frequency synchronizing-signal pulses from separator 20 are employed to drive a field-frequency sweep-signal generator 21, and the output current from generator 21 is impressed on a field-frequency magnetic-deflection coil 22 associated with cathode-ray tube 16.

Line-frequency synchronizing-signal pulses from separator 20 are applied to an automatic-frequency-control (AFC) phase-detector 23 for comparison with a locally generated signal from a line-frequency oscillator 24. The control signal developed by AFC phase-detector 23 is applied to a reactance tube 25 which controls the operating frequency of oscillator 24. The frequency-controlled output from oscillator 24 is used to drive a line-frequency sweep-signal generator 26 which serves to impress a scanning current of generally sawtooth waveform on a line-frequency magnetic-deflection coil 27 associated with cathode-ray tube 16 by means of a sweep-signal output transformer 28.

Line-frequency magnetic-deflection coil 27 comprises a pair of series-coupled winding-sections 29 and 30. In accordance with the invention, a linearizing device 31 is effectively coupled in series with magnetic-deflection coil 27 and comprises a coil 32 wound on a high-permeability ferromagnetic core 33. Linearizing device 31 also comprises a permanent magnet 34 or other means for inducing in core 33 unidirectional magnetic flux having a non-uniform distribution throughout the core. Also in accordance with the invention, the space relation between magnet 34 and core 33 is variable to provide a convenient means for controlling the size of the reproduced image.

Preferably, coil 32 of linearizing device 31 is connected in series between winding-sections 29 and 30 constituting magnetic-deflection coil 27, and in shunt with a damping resistor 35 provided with a center tap 36. A balancing condenser 37 is connected between the high-potential terminal of magnetic-deflection coil 27 and center tap 36 on resistor 35. This arrangement provides inductance and capacity balance between winding-sections 29 and 30 for all inductance values of size and linearity control device 31, as shown and described in detail in the copending application of Jack E. Bridges, Serial No. 194,518, filed November 7, 1950, now U. S. Patent No. 2,606,306, issued August 5, 1952, for Television Size Control Circuit and assigned to the present assignee. Alternatively, for the purposes of the present invention, the size and linearity control inductor may be connected in series between the secondary winding of sweep transformer 28 and magnetic-deflection coil 27, or in series with the primary winding of sweep transformer 28, it being essential only that coil 32 is effectively connected in series with magnetic-deflection coil 27.

The construction of the size and linearity control device 31 is shown in Figure 2 in which a double-ended high-permeability ferromagnetic core 33 is asymmetrically positioned with respect to a permanent magnet 34 and associated pole pieces 42 and 43. Coil 32 is wound on an insulating coil form 44 encircling core 33. Core 33 may be constructed of any magnetically soft material such as soft iron, silicon steel, or a suitable alloy of nickel, molybdenum, and iron such as that known as Permalloy, and may be laminated or comminuted to minimize eddy current losses. It is preferred, however, that the core be constructed of a ceramic comprising a mixture of oxides of iron and other metals; such ceramics are commercially known as ferrites, and are characterized by extremely high permeability combined with relatively low saturation flux.

It is apparent that, due to the asymmetrical space relation between magnet 34 and core 33, a unidirectional flux of non-uniform distribution is induced within the core. The flux density in the left-hand portion of the core 33 is obviously greater than that at the extreme right end, and of opposite direction in space. Moreover, between these two portions of the core there must be at least one transverse plane along which there is no axial premagnetization.

If the core is now moved closer to or farther away from magnet 34 in the direction indicated by arrow 45 without altering the position of coil 32 with respect to core 33, the intensity of the unidirectional flux induced in core 33 is increased or decreased, but the flux distribution throughout the core is not materially changed. Thus, movement of core 33 relative to magnet 34 affects primarily the amount of premagnetization of core 33 and hence the reactance of coil 32.

On the other hand, if coil 32 is moved axially along core 33 in the direction indicated by arrow 46, while core 33 is maintained in a fixed position, the unidirectional flux intensity within core 33 is maintained substantially unaltered, but the value of current at which saturation is obtained is varied.

The operation may perhaps most readily be understood from a consideration of Figures 3*a*, 3*b*, 4*a*, and 4*b*. In Figure 3*a*, coil 32 is positioned at a region of minimum unidirectional flux within core 33. With coil 32 in this position, the inductance vs. instantaneous current characteristic of coil 32 is represented by curve 50 of Figure 3*b*. The effect of reducing the spacing between magnet 34 and core 33 in the direction indicated by arrow 45 is shown by the other curves of Figure 3*b*, characteristics 51, 52 and 53 being successively obtained as core 33 is moved closer and closer to magnet 34. In practice, the sawtooth current impressed on coil 32 in series with magnetic-deflection coil 27 varies only within a narrow range bounded by limiting currents $I_1$ and $I_2$. With coil 32 in the neutral position shown in Figure 3*a*, the family of curves 51, 52, and 53 is symmetrical and variation of the spacing between core 33 and magnet 34 affects substantially only the inductance within the operating range between $I_1$ and $I_2$ without affecting the slope of the inductance characteristic within that range. Since the inductance of coil 32 affects substantially only the amplitude of deflection of the electron beam of cathode-ray tube 16 while the slope of the inductance characteristic determines the linearizing effect, it is apparent that movement of core 33 with respect to magnet 34 controls the size of the reproduced image. Substantially no linearizing effect is realized with coil 32 in the position shown in Figure 3*a* since the inductance characteristic for any core position is substantially flat within the operating range.

If coil 32 is now moved axially along core 33 to encompass a region of maximum unidirectional flux density within the core as shown in Figure 4*a*, the characteristic curves of Figure 4*b* are obtained. With coil 32 in this position, characteristics 54, 55, 56, and 57 are successively obtained by moving core 33 closer and closer to magnet 34 in the direction indicated by arrow 45. Such movement of core 33 now affects not only the magnitude of the inductance of winding 32 within the operating range, but also the slope of the inductance characteristic. Hence movement of the core effects both size control and linearity control of the reproduced image. Moreover, the linearizing effect provided by characteristics 55, 56, and 57 is always in the correct sense to compensate inherent non-linearity in the output of the sweep-signal generator, since the inductance of winding 32 at the maximum positive sweep current $I_2$ is less than that obtained for maximum negative sweep current $I_1$, so that a larger proportion of the total voltage appearing across the secondary winding of sweep transformer 28 is applied across the magnetic-deflection coil 27 at the end of each trace interval than at the beginning.

It is apparent from the foregoing discussion that within the range indicated by curves 55, 56, and 57 of Figure 4*b*, movement of core 33 with respect to magnet 34 affects primarily the amplitude of the line scan and the size of the reproduced image while movement of coil 32 along core 33 determines primarily the linearizing effect of the system. Actually the two control effects are concomitant with any change in the space relation between two or more of the elements consisting of coil 32, core 33, and magnet 34. By providing means for independently varying the space relation between core 33 and magnet 34 and that between coil 32 and core 33, a condition of substantially complete linearization may be obtained for any line scan amplitude within the operating range of the device.

Figure 5 is a fragmentary view of a portion of a television receiver, showing a focusing magnet 60 and a supporting plate 61 mounted on the neck 62 of a cathode-ray picture tube. Ferromagnetic core 33, on which is supported coil 32, is mounted in a bracket 63. Bracket 63 is fixed to supporting plate 61 by means of a screw 64 or other suitable device in a position such that core 33 is parallel with the axis of focusing magnet 60. Bracket 63 is slotted as shown at 65, and a slider 66 fixed to coil form 44 is arranged to cooperate with slot 65 to permit axial movement of coil 32 on core 33.

In the arrangement of Figure 5, the focusing magnet 60 which provides a focusing field for the electron beam of the picture tube, also serves as the permanent magnet for inducing unidirectional magnetic flux of non-uniform distribution in core 33 of the size and linearity control device. The space relation between coil 32 and focusing magnet 60 may be altered by rotating bracket 63 with mounting screw 64 as a pivot, while slider 66 provides a convenient means for displacing coil 32 axially along core 33. Both adjustments have concomitant effects on the amplitude and linearity of the line scan; rotation of bracket 63 with mounting screw 64 as a pivot affects primarily the line scan amplitude, while axial displacement of coil 32 affects primarily the linearity of the scan. The use of the focusing magnet to provide the necessary premagnetization field for core 33 has the obvious advantage of simplicity and economy.

In all of the embodiments thus far described, premagnetization of the core is effected by means of a permanent magnet. In the embodiment of Figure 6, an electromagnet is employed for this purpose. In Figure 6, coil 32 is supported on a long thin tubular core 33 of ferrite material or the like. An electromagnet 70, which may conveniently comprise a helical coil wound on a soft iron core, is supported wholly within tubular core 33. Electromagnet 70 may be energized from any suitable energizing source such as a battery 71, and a potentiometer 72 is provided to permit variation of the intensity of the unidirectional magnetic flux induced in core 33 by electromagnet 70. For any given set of circuit parameters, the characteristics of core 33 and the space relations between coil 32, core 33, and electromagnet 70 may be so selected that substantially complete linearization is obtained throughout a practical range of values of unidirectional magnetic flux induced in core 33 by electromagnet 70. Consequently, coil 32 may be supported in a fixed position encompassing core 33, and electromagnet 70 may be of any practical length not greater than the length of core 33. However, as a practical matter, the circuit parameters and the ferromagnetic characteristics of the core material may vary appreciably from unit to unit within manufacturing tolerances. Moreover, the amount of inherent non-linearity in the broadcast signal may vary from one transmitter to another, so that it may be desirable to provide means for introducing a compensating non-linearity at the receiver to permit reproduction of an apparently undistorted image. Consequently, it is preferred that electromagnet 70 be short with respect to the axial length of core 33 so that the unidirectional magnetic flux induced in the core is of a non-uniform distribution, and that the space relation between coil 32 and core 33 be variable, as indicated by arrow 46. Alternatively, coil 32 may be fixed with respect to core 33 if electromagnet 70 is movable in an axial direction within core 33. In this manner, two variables are provided so that size and linearity control over a wide range of operating conditions may be effected; the unidirectional-flux intensity within ferromagnetic core 33 may be controlled by means of potentiometer 72 while the coupling between coil 32 and core 33 may be varied by moving coil 32 axially along the core.

As an additional advantage over prior art saturable reactors employing electromagnets for premagnetizing the core, the arrangement of Figure 6 requires no external choke or balancing arrangement to separate the alternating-current and the direct-current circuits. The alternating flux induced by the current in coil 32 seeks a path through the air from one end of the tubular core to the other, avoiding the inside of the core; thus a negligible amount of alternating flux is induced in the iron core of the electromagnet 70. Viewed in another way, the ferrite tube 33 shields electromagnet 70 from coil 32. On the other hand, the unidirectional-flux path of the electromagnet contains only two short wide cylindrical air gaps transversed by the unidirectional flux in a radial direction; the magnetic circuit for unidirectional flux is therefore very efficient.

Thus, the present invention provides a novel device for concomitantly controlling the size and linearity of the reproduced image in a television receiver. The device is simple and inexpensive to construct and is capable of providing substantially complete linearization for any picture size within the operating range. Although a saturable reactor is employed, it is unnecessary to provide a choke or balancing arrangement to isolate the alternating-flux-producing means and the unidirectional-flux-producing means from each other.

In all the described embodiments employing permanent magnets, variation of the intensity of the induced flux within the ferromagnetic core is provided by varying the spacing between the core and the magnet in a rectilinear fashion. It is apparent that equally good results may be obtained by moving the magnet relative to the core, and rotary movement of either the magnet or the core may be employed to vary the intensity of the induced flux. Moreover, it is also within the scope of the invention to employ a magnetic shunt or equivalent arrangement in lieu of varying the space relation between the magnet and the core.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a coil encompassing a double-ended high-permeability ferromagnetic core and effectively connected in series with said magnetic-deflection coil, and a magnet spaced from said core for inducing unidirectional magnetic flux in said core; and means for varying the intensity of said magnetic flux to control the amplitude of deflection of said electron beam.

2. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a coil encompassing a double-ended high-permeability ferromagnetic core and effectively connected in series with said magnetic-deflection coil, and a permanent magnet spaced from said core for inducing unidirectional magnetic flux in said core; and means for varying the space relation between said magnet and said core to control the intensity of said magnetic flux and the amplitude of deflection of said electron beam.

3. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a second coil encompassing a high-permeability ferromagnetic core and effectively connected in series with said magnetic-deflection coil, and means for inducing in said core unidirectional magnetic flux having a non-uniform distribution within said core; and means for varying the intensity of said magnetic flux and the space relation between said second coil and said core to control the amplitude of deflection of said electron beam and the linearizing effect of said device.

4. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a second coil encompasing a high-permeability ferromagnetic core and effectively connected in series with said magnetic-deflection coil, and means for inducing in said core unidirectional magnetic flux having a non-uniform distribution within said core; and means for independently varying the intensity of said magnetic flux and the space relation between said second coil and said core to control the amplitude of deflection of said electron beam and the linearizing effect of said device.

5. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a second coil encompassing a cylindrical high-permeability ferromagnetic core and effectively connected in series with said magnetic-deflection coil, and a magnet spaced from said core for inducing therein unidirectional magnetic flux having a non-uniform distribution within said core; and means for varying the space relation between said magnet and said core and for varying the axial position of said second coil on said core to control the amplitude of deflection of said electron beam and the linearizing effect of said device.

6. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a second coil encompassing a high-permeability ferromagnetic core and effectively connected in series with said magnetic-deflection coil, and a permanent magnet spaced from said core for inducing therein unidirectional magnetic flux having a non-uniform distribution within said core; and means for independently varying the space relations between said magnet and said core and between said second coil and said core to control the amplitude of deflection of said electron beam and the linearizing effect of said device.

7. In a deflecting circuit for a cathode-ray tube: a permanent magnet associated with said cathode-ray tube for focusing the electron beam thereof; a magnetic-deflection coil responsive to an applied scanning current to deflect said electron beam in accordance with a predetermined scanning pattern; a sweep-signal generator coupled to said magnetic-deflection coil for applying thereto a periodic scanning current of generally sawtooth waveform; a linearizing device comprising a coil effectively connected in series with said magnetic-deflection coil and encompassing a high-permeability ferromagnetic core supported within the magnetic field of said focusing magnet, whereby a unidirectional magnetic flux is induced in said core; and means for varying the space relation between said core and said focusing magnet to control the intensity of said magnetic flux and the amplitude of deflection of said electron beam.

8. In a deflecting circuit for a cathode-ray tube: a permanent magnet associated with said cathode-ray tube for focusing the electron beam thereof; a magnetic-deflection coil responsive to an applied scanning current to deflect said electron beam in accordance with a predetermined scanning pattern; a sweep-signal generator coupled to said magnetic-deflection coil for applying thereto a periodic scanning current of generally sawtooth waveform; a linearizing device comprising a second coil effectively connected in series with said magnetic-deflection coil and wound on a double-ended high-permeability ferromagnetic core asymmetrically supported in the magnetic field of said focusing magnet, whereby a unidirectional magnetic flux of non-uniform distribution is induced in said core; and means for varying the space relations between said core and said focusing magnet and between said second coil and said core to control the amplitude of deflection of said electron beam and the linearizing effect of said device.

9. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a coil encompassing a double-ended tubular high-permeability ferromagnetic core and effectively connected in series with said magnetic-deflection coil, and an electromagnet supported wholly within said tubular core for inducing unidirectional magnetic flux in said core; and means for varying the intensity of said magnetic flux to control the amplitude of deflection of said electron beam.

10. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a coil encompassing a double-ended tubular high-permeability ferromagnetic core and effectively connected in series with said magnetic-deflection coil, and an electromagnet of a length short relative to that of said core supported wholly within said tubular core for inducing therein unidirectional magnetic flux having a non-uniform distribution within said core; and means for varying the intensity of said magnetic flux to control the amplitude of deflection of said electron beam.

References Cited in the file of this patent

UNITED STATES PATENTS

| | | |
|---|---|---|
| 1,896,510 | Given | Feb. 7, 1933 |
| 2,000,378 | Deisch | May 7, 1935 |
| 2,380,242 | Jewell | July 10, 1945 |
| 2,435,062 | Walsh | Jan. 27, 1948 |
| 2,438,359 | Clapp | Mar. 23, 1948 |
| 2,440,418 | Tourshou | Apr. 27, 1948 |
| 2,503,155 | Harvey et al. | Apr. 4, 1950 |
| 2,513,160 | Friend | June 27, 1950 |
| 2,543,719 | Clark | Feb. 27, 1951 |
| 2,553,360 | Court | May 15, 1951 |
| 2,555,829 | Barco | June 5, 1951 |
| 2,566,510 | Barco | Sept. 4, 1951 |
| 2,594,567 | Landon | Apr. 29, 1952 |
| 2,596,226 | Eldridge | May 13, 1952 |
| 2,612,541 | De Armond | Sept. 30, 1952 |